United States Patent [19]

Glickstein et al.

[11] Patent Number: 5,511,374
[45] Date of Patent: Apr. 30, 1996

[54] HIGH PRESSURE AIR SOURCE FOR AIRCRAFT AND ENGINE REQUIREMENTS

[75] Inventors: Marvin R. Glickstein, North Palm Beach; James T. Dixon; Donald M. Podolsky, both of Jupiter, Fla.

[73] Assignee: United Technologies Corporation, Hartford, Conn.

[21] Appl. No.: 381,248

[22] Filed: Jan. 31, 1995

Related U.S. Application Data

[62] Division of Ser. No. 189,569, Jan. 31, 1994, Pat. No. 5,452,573.

[51] Int. Cl.[6] .................................. F02C 6/08; F02C 7/18
[52] U.S. Cl. ...................... 60/39.02; 60/39.07; 60/39.183
[58] Field of Search .......................... 60/39.02, 39.07, 60/39.183, 39.83, 226.1, 266, 736; 454/71, 76

[56] References Cited

U.S. PATENT DOCUMENTS

| | | | |
|---|---|---|---|
| 2,772,621 | 12/1956 | Arnoldi | 454/71 |
| 3,177,679 | 4/1965 | Quick et al. | 454/71 |
| 4,474,001 | 10/1984 | Griffin et al. | 60/39.83 |
| 4,503,666 | 3/1985 | Christoff | 60/39.07 |
| 5,137,230 | 8/1992 | Coffinberry | 60/39.07 |

*Primary Examiner*—Louis J. Casaregola
*Attorney, Agent, or Firm*—Christopher T. Hayes

[57] ABSTRACT

A method and apparatus for supplying cooling air on vehicles such as high speed aircraft includes diverting high pressure air from the compressor section of a gas turbine engine, cooling this air in a heat exchanger, compressing the air and subsequently cooling the air in a second heat exchanger to provide cooled, high pressure air. One embodiment additionally provides cooled air at relatively medium pressure and relatively low pressure, while the alternate embodiment additionally provides cooled air at relatively low pressure.

12 Claims, 2 Drawing Sheets

HIGH PRESSURE AIR SOURCE FOR AIRCRAFT AND ENGINE REQUIREMENTS

This is a division of application Ser. No. 08/189,569, filed in Jan. 31, 1994 (U.S. Pat. No. 5,452,573).

FIELD OF THE INVENTION

This invention relates to a method and apparatus for generating cool air at differing pressures, including relatively high pressure, for meeting the cooling requirements, and other requirements of aircraft components and/or engine components.

BACKGROUND OF THE INVENTION

Survivability and structural requirements in advanced aircraft require cooling and thermal management of aircraft and propulsion structures. Additionally, some applications of aircraft technology, particularly those applications on supersonic aircraft, require sources of cooled, high pressure air. Conventional methods for propulsion system cooling in current aircraft engines typically employ either engine fuel, or air from one of the various sources in the propulsion system as a coolant. Among the traditional sources of cooling air are 1) ram air from the inlet, 2) air from the fan (in turbofan engines), or 3) air from the high compressor.

These sources for cooling air have generally been adequate for cooling aircraft components up to this time, the cooling air being primarily used for maintaining structural integrity of engine components. Although cooling air diverted from the aforementioned sources impacts overall engine performance, the cooling requirements have heretofore been achieved with only minimal impact on engine performance. However, as the amount of electronic and other heat generating equipment carried on aircraft has increased, the requirement for cooling system capability has correspondingly increased. In addition, as aircraft speeds and capabilities increase beyond about Mach 3, the demands on the cooling systems of aircraft increase as well. These increased speeds and capabilities require cooling of aircraft components such as leading edges of the airframe, and certain parts of the engine exposed to high temperature combustion products. Additionally, new uses of cool, high pressure air on aircraft increase the demand for such air beyond that amount that is currently available. The increasingly stringent requirements for future vehicle/engine systems will require improved sources of low temperature coolants.

What is needed is a method for producing cooled air at relatively high pressure, and at other relatively lower pressure as needed by the aircraft components and engines without substantially increasing the amount of cooling air diverted from the traditional sources of cooling air.

SUMMARY OF THE INVENTION

It is therefore an object of the present invention to provide a method for increasing the production of cooled, relatively high pressure air for vehicle components, and engine components of the vehicle.

Another object of the present invention is to provide a method for increasing the cooling capability for aircraft components and engines without substantially increasing the amount of cooling air diverted from the traditional sources of cooling air.

According to the present invention a method and apparatus are disclosed that provide for supplying cooling air on vehicles such as high speed aircraft. The method includes diverting high pressure air from the compressor section of a gas turbine engine, cooling this air in a heat exchanger, compressing the air and subsequently cooling the air in a second heat exchanger to provide cooled, high pressure air. One embodiment additionally provides cooled air at relatively medium pressure and relatively low pressure, while the alternate embodiment additionally provides cooled air at relatively low pressure.

The foregoing and other features and advantages of the present invention will become more apparent from the following description and accompanying drawings.

DETAILED DESCRIPTION OF THE INVENTION

Figure 1:
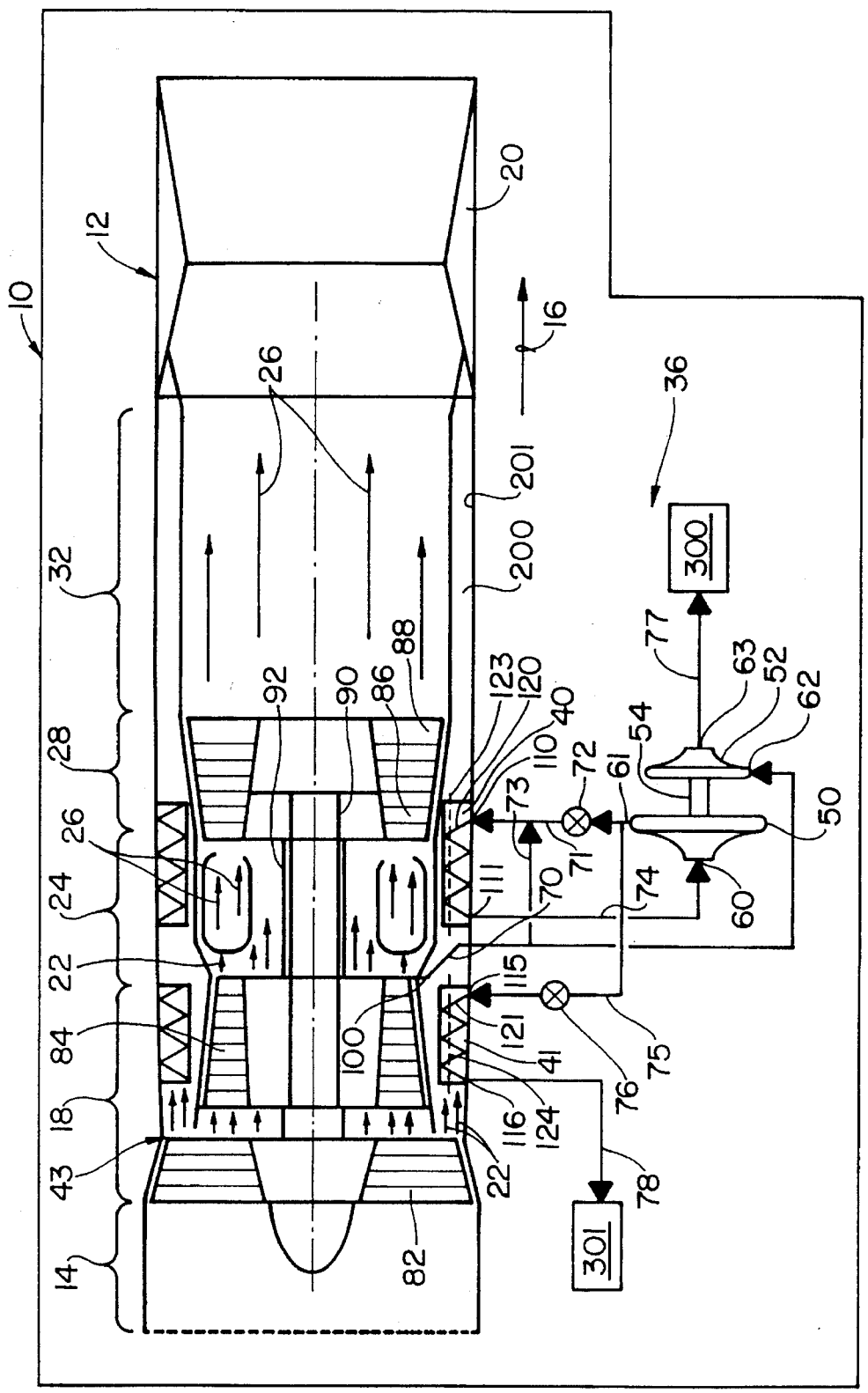
FIG. 1 is a schematic view of the components of the first embodiment of the apparatus of the present invention for a vehicle powered by a turbofan gas turbine engine.

The method and apparatus of the present invention is for generating cooled air for cooling components of aircraft vehicles that incorporate large amounts of heat generating equipment on board, or have other requirements for pressurized cool air, such as may exist for a high speed vehicle 10, such as an aircraft that flies at supersonic speeds in excess of Mach 3. FIG. 1 illustrates a concept for the primary purpose of providing high pressure air, with no specific cooling requirement. This concept provides capability for producing cooled high pressure air, with air flow rates varying over a wide range, in response to aircraft requirements. Practicing this invention requires at least one gas turbine engine 12 in the vehicle, such as the engine shown in FIG. 1.

The engine 12, which is preferably a turbofan, includes, in serial flow arrangement, an engine inlet section 14 for receiving ambient air and delivering the ambient air to the compressor section 18, and aft 16 of the inlet section 14 is the compressor section 18 for compressing the ambient air thereby producing compressed air 22 at a first pressure. The compressor section 18 has, in serial flow arrangement, a low pressure compressor, or "fan" 82, and a high pressure compressor 84. The high pressure compressor 84 is for compressing air received from the low compressor 82 at the first pressure to produce compressed air at a second pressure. The high pressure compressor 84 has an exit stage bleed 100 for extracting air therefrom at a bleed pressure essentially equal to the second pressure. Aft of the compressor section 18 is a combustor section 24 for mixing fuel with the compressed air 22 and igniting the fuel and compressed air 22 to produce combustion products 26. Aft of the combustion section 24 is a turbine section 28 for expanding the combustion products 26 and driving the compressor section 18. The turbine section 28 of the turbofan 80 has in serial flow arrangement, a high pressure turbine 86 and a low pressure turbine 88. The low pressure turbine 88 drives the fan 82 via the low shaft 90 which connects the low pressure turbine 88 to the fan 82, and the high pressure turbine 86 drives the high compressor 84 via the high shaft 92 which connects the high pressure turbine 86 to the high compressor 84. Aft of the turbine section 28 is an exhaust section 32 for conveying the combustion products 26 from the turbine section 28, through the nozzle 20, and out of the aft end of the gas turbine engine 12. A bypass duct 200 extends between the exhaust section 32 and the outlet of the low compressor 82 to permit compressed air exiting the low compressor to bypass around the high compressor, the combustor section 24 and turbine section 28.

The vehicle 10 also includes first 40 and second 41 heat exchangers located in the bypass duct 200, as shown in FIG. 1. Each of the heat exchangers 40, 41 is preferably "doughnut" shaped, extending radially about the radially inner wall 201 of the bypass duct 200. The second heat exchanger 41 is located between the first heat exchanger 40 and the low pressure compressor 82, so that the second heat exchanger 41 is upstream of the first heat exchanger 40 relative to the flow of compressed air 22 flowing through the bypass duct 200 from the exit 43 of the low compressor 82. Each of the heat exchangers 40, 41 has first 123, 124 and second 120, 121 flow paths extending therethrough, and each flow path has an inlet and an outlet. The first flow path of each heat exchanger is exposed to the compressed air 22 exiting the low compressor, and it is this compressed air 22 which is the coolant for the first and second heat exchangers 40, 41.

The present invention also has an auxiliary unit 36 which includes an auxiliary compressor 50 and an auxiliary turbine 52, and the auxiliary turbine 52 is connected to the auxiliary compressor 50 by an auxiliary shaft 54 to provide power thereto. The auxiliary compressor 50 has a compressor inlet port 60 and a compressor discharge port 61, and the auxiliary turbine likewise has a turbine inlet port 62 and a turbine discharge port 63.

A first conduit 70 connects exit stage bleed of the high pressure compressor to the turbine inlet port 62, and a second conduit 71 connects the compressor discharge port 61 to the inlet 110 of the second flow path 120 of the first heat exchanger 40. As used herein, the word "connect" when used in relation to the conduits means that the conduit provides a path for the flow of air between each of the elements to which a particular conduit is connected. As shown in FIG. 1, the second conduit 71 includes a throttle valve 72 therein, the purpose of which is discussed in greater detail below. A third conduit 73 is connected to the second conduit 71 between the throttle valve 72 and the inlet 110 to the second flow path 120 of the first heat exchanger 40, and the third conduit 73 is also connected to the first conduit 70 to receive compressed air therefrom. A fourth conduit 74 connects the outlet 111 of the second flow path 120 of the first heat exchanger 40 to the compressor inlet port 60, and a fifth conduit 75 connects the inlet 115 of the second flow path 121 of the second heat exchanger 41 to the second conduit 71. The fifth conduit 75 is connected to the second conduit 71 between the throttle valve 72 and the compressor discharge port 61, and the fifth conduit 75 preferably includes a flow control valve 76 therein. A sixth conduit 77 is connected to the turbine discharge port 63, and is also connected to a component 300 that can utilize cool air that is at relatively low pressure, and preferably is at ambient pressure so that the maximum amount of energy that can be extracted from the compressed air expanding through the auxiliary turbine 52 is extracted to drive the auxiliary compressor 50. A seventh conduit 78 is connected to the outlet 116 of the second flow path 121 of the second heat exchanger 41, and the seventh conduit 78 is connected to components 301 that utilize relatively high pressure cool air.

In operation some of the compressed air 22 exiting the low pressure compressor 82 at a first, known pressure is diverted into the bypass duct 200 and flows through the first flow path 123, 124 of the first and second heat exchangers 40, 41, and this compressed air is the coolant for the heat exchangers 40, 41. A portion of the compressed air from the high pressure compressor 84 is diverted therefrom through the exit stage bleed 100 at a second pressure significantly higher than the first pressure, and as those skilled in the art will readily appreciate, the compressed air bled from the high pressure compressor 84 is at a significantly higher temperature than the compressed air exiting the low pressure compressor 82. The portion bled from the high pressure compressor 84 is then split into a first part which is routed to the turbine inlet port 62, and a second part that is routed to the inlet 110 of the second flow path 120 of the first heat exchanger 40 via the third 73 and second 71 conduits, and introduced into the second conduit 71 between the throttle valve 72 and the inlet 110 to the second flow path 120 of the first heat exchanger 40, as shown in FIG. 1. The first part of the portion bled from the high pressure compressor 84 is expanded through the auxiliary turbine 52, thereby producing cooled, relatively low pressure air for cooling components of the vehicle, and providing work to drive the auxiliary compressor via the auxiliary shaft 54.

The second part of the portion flows into the inlet 110 of the second flow path 120 of the first heat exchanger 40, flows through the second flow path 120 thereof and out of the outlet 111 thereof while some of the compressed air from the low compressor flows through the first flow path 123 of the first heat exchanger 40, thereby cooling the second part. The second part exiting the outlet 111 of the second flow path 120 of the first heat exchanger 40 is then delivered to the compressor inlet port 60 and compressed to a higher pressure in the auxiliary compressor 50, so that the second part exits the auxiliary compressor 50 through the discharge port 61 thereof at a third pressure significantly higher than the second pressure.

A first amount of the second part of compressed air, which first amount may be some or all of the compressed air exiting the auxiliary compressor 50 at the third pressure, is recirculated through the first heat exchanger 40 by bleeding the first amount through the throttle valve 72. The recirculated compressed air is cooled again in the first heat exchanger 40 and then returns to the auxiliary compressor inlet port 60 via the fourth conduit 74. The throttle valve 72 reduces the pressure of the first amount to a pressure essentially the same as the first pressure prior to recirculating the first amount through the second flow path 120 of the first heat exchanger 40.

A second amount of the second part of compressed air at the third pressure, which may be some or all of the compressed air exiting the auxiliary compressor discharge port 61, is diverted through the flow control valve 76 in the fifth conduit 75 to the second heat exchanger 41 where it is cooled. The flow control valve 76 is used to selectively modulate the flow of the second amount of the second part of compressed air at the third pressure from the second conduit 71 through the fifth conduit 75 to the inlet 115 of the second flow path 121 of the second heat exchanger 41. The second amount then flows into the inlet 115 of the second flowpath 121 of the second heat exchanger 41 and through the second flow path 121 thereof while some of the compressed air from the low compressor 82 is flowing through the first flow path 124 thereof, cooling the second amount at the third pressure, thereby producing cooled, relatively high pressure air for cooling components of the vehicle 10. As air is diverted from the recirculating compressor loop 71, 120, 74 through the flow control valve 76, the diverted air is replaced by air bled from the engine high pressure compressor through the exit stage bleed 100. It must be understood that in this concept, the compressed air at stations in the third conduit 73 and in the second conduit 71 between the throttle valve 72 and the inlet 110 of the second flow path 120 of the first heat exchanger 40, as well as the air within the second flow path 120 of the first heat exchanger 40 are at the pressure of the engine high pressure compressor exit stage bleed 100 pressure, while the air in the fifth conduit 75, the sixth conduit 78, and the second flow path 121 of the second heat exchanger 41 are at a substantially higher pressure, based on the overall pressure ratio increase of the auxiliary compressor 50. The air in the sixth conduit 77 is cool and at relatively low pressure, and can be returned to the engine exhaust system, or dumped into an appropriate low pressure region of the aircraft. The relatively high pressure air exiting the second flow path 121 of the second heat exchanger 41 can be used for aircraft requirements, or a portion of this air can be used for cooling high pressure regions of the aircraft engine 12, such as compressor or turbine components, thus allowing improved performance and or durability of the engine components.

Figure 2:
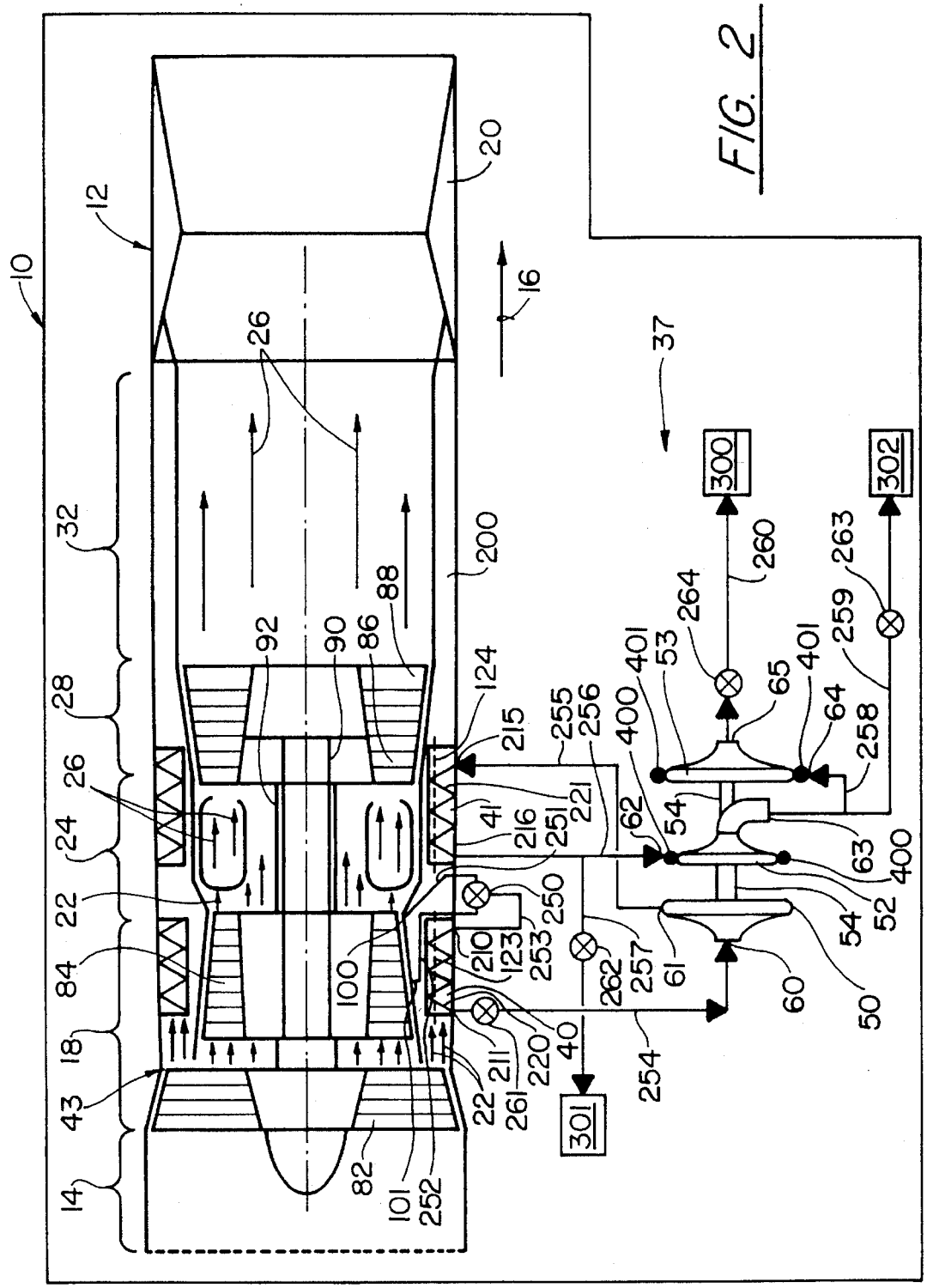
FIG. 2 is a schematic view of the components of the second embodiment of the apparatus of the present invention for a vehicle powered by a turbofan gas turbine engine.

FIG. 2 illustrates an alternate embodiment of the present invention in which provision is made to supply a range of air sources at various pressures and temperatures, for satisfying a supersonic aircraft's environmental control requirements, providing general cooling to the various thermal management systems, and supplying high pressure air for aircraft attitude or aerodynamic control. As FIG. 2 shows, the elements of the turbofan 12 are the same as those shown for the turbofan 12 in FIG. 1, except that in addition to the exit stage bleed 100, the turbofan 12 of the alternate embodiment also includes an interstage bleed 101. Otherwise, the reference numerals in FIG. 2 represent the same elements as they represented in FIG. 1.

The vehicle 10 also includes first and second heat exchangers 40, 41 located in the bypass duct 200, as shown in FIG. 2, and each of the heat exchangers 40, 41 is similar to those described in the preferred embodiment. However, in the alternate embodiment, the first heat exchanger 40 is located between the second heat exchanger 41 and the low pressure compressor 82, so that the first heat exchanger 40 is upstream of the second heat exchanger 41 relative to the flow of compressed air 22 flowing through the bypass duct 200 from the exit 43 of the low compressor.

The auxiliary unit 37 of the alternate embodiment includes an auxiliary compressor 50 having a compressor inlet port 60 and a compressor discharge port 61, a first auxiliary turbine 52 having a first turbine inlet port 62 and a first turbine discharge port 63, and a second auxiliary turbine 53 having a second turbine inlet port 64 and a second turbine discharge port 65. The first and second auxiliary turbines 52, 53 are connected to the auxiliary compressor 50 by an auxiliary shaft 54 to provide power thereto, as shown in FIG. 2. The auxiliary unit 37 also includes a selector valve 250, and a first conduit 251 connects the exit stage bleed 100 to the selector valve 250, and a second conduit 252 connects the interstage bleed 101 to the selector valve 250. A third conduit 253 connects the selector valve 250 to the inlet 210 of the second flow path 220 of the first heat exchanger 40, and a fourth conduit 254 connects the outlet 211 of the second flow path 220 of the first heat exchanger 40 to the compressor inlet port 60. A fifth conduit 255 connects the compressor discharge port 61 to the inlet 215 of the second flow path 221 of the second heat exchanger 41, and a sixth conduit 256 connects the outlet 216 of the second flow path 221 of the second heat exchanger 41 to the first inlet port 62 of the first turbine 52. A seventh conduit 257 connects the sixth conduit 256 to components 301 that utilize cool, relatively high pressure air, and an eighth conduit 258 connects the first turbine discharge port 63 to the second turbine inlet port 64. A ninth conduit 259 connects the eighth conduit 258 to components 302 that utilize cool, relatively medium pressure air, and a tenth conduit 260 connects the second turbine discharge port 65 to components 300 that utilize cool, relatively low pressure air. Additionally, the fourth conduit 254 includes a first flow control valve 261 therein, the seventh conduit 257 includes a second flow control valve 262 therein, the ninth conduit 259 includes a third flow control valve 263 therein, and the tenth conduit 260 includes a fourth flow control valve 264 therein.

In operation, some of the compress air exiting the low pressure compressor 82 at a first known pressure is diverted into the bypass duct 200 and flows through the first flow path 123, 124 of the first and second heat exchangers 40, 41. The selector valve 250 is used to divert a portion of compressed air from the high compressor 84 through either the interstage bleed 101 or the exit stage bleed 100, depending on the current requirements for cool air on the vehicle 10. Compressed air diverted from the exit stage bleed 100 is at a second pressure that is significantly greater than the first pressure, while compressed air diverted from the interstage bleed 101 is at a third pressure that is greater than the first pressure but less than the third pressure. The flow of the portion into the fourth conduit 254 is initiated by opening the first flow control valve 261. This portion then flows into the inlet 210 of the second flow path 220 of the first heat exchanger 40 and out of the outlet 211 thereof while some of the compressed air from the low compressor 82 flows through the first flow path 123 of the first heat exchanger 40, thereby cooling the second flow path 220 thereof and the diverted portion of compressed air.

The diverted portion of compressed air is then compressed to a greater pressure by delivering the portion exiting the outlet 211 of the second flow path 220 of the first heat exchanger 40 to the compressor inlet port 60 through the fourth conduit 254 and compressing the portion in the auxiliary compressor 50. The portion then exits the auxiliary compressor 50 through the compressor discharge port 61 into the fifth conduit 255 at a fourth pressure significantly higher than the second pressure. The portion is then cooled at the fourth pressure by flowing the portion exiting the compressor discharge port 61 into the inlet 215 of the second flow path 22 1 of the second heat exchanger 41 and through the second flow path 221 thereof. Since the first flow path 124 of the second heat exchanger 41 is simultaneously being cooled by the compressed air at the first pressure flowing through the first flow path 124 thereof, the portion of compressed air is cooled at the fourth pressure, thereby producing cooled, relatively high pressure air which flows into the sixth conduit 256. The flow of this cooled, relatively high pressure air through the seventh conduit 257 to the components 301 of the vehicle 10 is controlled by the second flow control valve 262, as shown in FIG. 2. A first part of the portion is delivered to the first turbine inlet port 62 and expanded through the first auxiliary turbine 52, providing work to drive the auxiliary compressor 50 via the auxiliary shaft 54 and simultaneously reducing the temperature of the first part exiting the first discharge port 63 thereof. The flow of the first part into the first turbine 52 is preferably controlled and directed by variable inlet guide vanes 400, of the type known in the art, to maximize the efficiency of the work produced by the expanding first part. The flow rate and efficient expansion of air in the auxiliary turbines 52, 53 is controlled by these variable geometry inlet guide vanes 400, 401. These control features are applications of existing technology, and therefore are beyond the scope of the present invention.

The first part exiting the first discharge port 63 is cooled, relatively medium pressure air which flows into the eighth conduit 258. If the vehicle 10 has a current requirement for such cooling air, the third flow control valve 263 is opened, and cooled, relatively medium pressure air flows to those components 302 of the vehicle 10 requiring such cooling air. If there is no current need for such air, or such need does not require all of such air, a first amount of the first pan is delivered to the second turbine inlet port 64 via the eighth conduit 258. As those skilled in the art will readily appreciate, due to the high air pressure of the air exiting the second flow path 221 of the second heat exchanger 41 and the very large potential pressure ratio between such air and the external ambient air, two stages of expansion may be necessary (with current technology radial-inflow-turbines) to fully utilize the expansion work potential, and corresponding refrigeration potential of such air. The flow of the air entering the second auxiliary turbine 53 is likewise controlled and directed by variable inlet guide vanes 401, and the first amount is expanded through the second auxiliary turbine 53, providing work to drive the auxiliary compressor 50 via the auxiliary shaft 54 and reducing the temperature of the first amount exiting the second discharge port 65 thereof. The air exiting the second turbine discharge port 65 is cooled, relatively low pressure air which flows into the tenth conduit 260 to components 300 of the vehicle 10 requiring such air, or else this air is dumped overboard. The flow of such air through the tenth conduit 260 is controlled by the fourth flow control valve 264.

Although this invention has been shown and described with respect to a detailed embodiment thereof, it will be understood by those skilled in the art that various changes in form and detail thereof may be made without departing from the spirit and scope of the claimed invention.

We claim:

1. A method for producing cooled air at relatively high, medium, and low pressures for use with components of a vehicle, said method comprising:

providing at least one gas turbine engine in said vehicle, said engine having in serial flow arrangement a low pressure compressor and a high pressure compressor, said low pressure compressor for compressing ambient air to produce compressed air at a first pressure and said high pressure compressor for compressing air at said first pressure to produce compressed air at a second pressure, said high pressure compressor having an interstage bleed for extracting air therefrom at a third pressure significantly greater than the first pressure and significantly less than the second pressure and said high pressure compressor having an exit stage bleed for extracting air therefrom at a bleed pressure essentially equal to the second pressure;

diverting a portion of said compressed air from said high pressure compressor through one of said bleeds;

cooling the portion in a cooled flow path that is cooled with some of said compressed air at said first pressure;

compressing the portion to a fourth pressure significantly higher than said second pressure;

cooling said portion at said fourth pressure, thereby producing cooled, relatively high pressure air for cooling components of said vehicle;

expanding a first pan of said portion, thereby producing cooled, relatively medium pressure air for cooling components of said vehicle; and, expanding a first amount of said first part, thereby producing cooled, relatively low pressure air for cooling components of said vehicle.

2. The method of claim 1 wherein the gas turbine engine includes, in serial flow arrangement with the high pressure compressor, a combustor section for mixing fuel with said compressed air at said second pressure and igniting said fuel and compressed air at said second pressure to produce combustion products, a turbine section for expanding said combustion products and driving the low and high pressure compressors, an exhaust section for conveying said combustion products from said turbine section and out of said gas turbine engine, a bypass duct extending between the low pressure compressor and the exhaust section for bypassing compressed air exiting the low compressor around the high pressure compressor, the combustor section and the turbine section, and first and second heat exchangers located in said bypass duct, each heat exchanger having first and second flow paths extending therethrough, the second flow path of the first heat exchanger defining said cooled flow path, each flow path having an inlet and an outlet, said first flow path of each heat exchanger exposed to some of said compressed air at said first pressure, and the step of diverting a portion of said compressed air from said high pressure compressor includes diverting said some of said compressed air from said low pressure compressor into the bypass duct and flowing said some of said compressed air through the first flow path of the first and second heat exchangers.

3. The method of claim 2 wherein the step of diverting a portion of said compressed air from said high pressure compressor through one of said bleeds is preceded by the step of:

providing an auxiliary unit in said vehicle, said auxiliary unit including an auxiliary compressor having a compressor inlet port and a compressor discharge port, a first auxiliary turbine having a first turbine inlet port and a first turbine discharge port, and a second auxiliary turbine having a second turbine inlet port and a second turbine discharge port, said first and second auxiliary turbines connected to said auxiliary compressor by a shaft to provide power thereto.

4. The method of claim 3 wherein the step of cooling the portion in a cooled flow path includes flowing the portion into the inlet of the second flow path of the first heat exchanger and out of the outlet of the second flow path thereof while flowing said some of said compressed air through said first flow path thereof, thereby cooling said portion.

5. The method of claim 4 wherein the step of compressing the portion to a fourth pressure significantly higher than said second pressure includes delivering said portion exiting the outlet of the second flow path of the first heat exchanger to the compressor inlet port and compressing said portion in said auxiliary compressor, said portion exiting said auxiliary compressor through said compressor discharge port at a fourth pressure significantly higher than said second pressure.

6. The method of claim 5 wherein the step of cooling said portion at said fourth pressure includes flowing said portion exiting the compressor discharge port into the inlet of the second flowpath of the second heat exchanger and through the second flow path thereof while cooling said portion with said some of said compressed air flowing through the first flow path thereof, cooling said portion at said fourth pressure, thereby producing cooled, relatively high pressure air for cooling components of said vehicle.

7. The method of claim 6 wherein the step of expanding a first part of said portion includes delivering a first part of said Portion to said first turbine inlet port and expanding said first part through said first auxiliary turbine, thereby providing work to drive the auxiliary compressor via said shaft, reducing the temperature of the first part exiting the first discharge port thereof, and producing cooled, relatively medium pressure air for cooling components of said vehicle.

8. The method of claim 7 wherein the step of expanding a first amount of said first part includes delivering a first amount of said first part exiting the first turbine discharge port to said second turbine inlet port and expanding said first amount through said second auxiliary turbine, providing work to drive the auxiliary compressor via said shaft and reducing the temperature of the first amount exiting the second discharge port thereof, thereby producing cooled, relatively low pressure air for cooling components of said vehicle.

9. The method of claim 8 wherein the first heat exchanger is located between said second heat exchanger and said low pressure compressor.

10. The method of claim 9 wherein said vehicle is a supersonic aircraft.

11. An apparatus for producing cooled air at relatively high, medium, and low pressures for use with components of a vehicle, said apparatus comprising a gas turbine engine having in serial flow arrangement a low pressure compressor and a high pressure compressor for compressing ambient air thereby producing compressed air, a combustor section for mixing fuel with said compressed air and igniting said fuel and compressed air to produce combustion products, a turbine section for expanding said combustion products and driving the low and high pressure compressors, an exhaust section for conveying said combustion products from said turbine section and out of said gas turbine engine, said high pressure compressor having an interstage bleed for extracting air therefrom at a bleed pressure significantly greater than the first pressure and significantly less than the second pressure, said high pressure compressor having an exit stage bleed for extracting air therefrom at a bleed pressure essentially equal to the second pressure, and said engine having a bypass duct extending between the low pressure compressor and the exhaust section for bypassing compressed air exiting the low pressure compressor around the high compressor, combustor section and turbine section;

first and second heat exchangers located in said bypass duct, said first heat exchanger located between said second heat exchanger and said low pressure compressor, each heat exchanger having first and second flow paths extending therethrough, each flow path having an inlet and an outlet, said first flow path of each heat exchanger exposed to the compressed air exiting the low pressure compressor; and, an auxiliary unit including an auxiliary compressor having a compressor inlet port and a compressor discharge port, a first auxiliary turbine having a first turbine inlet port and a first turbine discharge port, a second auxiliary turbine having a second turbine inlet port and a second turbine discharge port, said first and second auxiliary turbines connected to said auxiliary compressor by a shaft to provide power thereto, a selector valve, a first conduit connecting said exit stage bleed to the selector valve, a second conduit connecting said interstage bleed to the selector valve, a third conduit connecting the selector valve to the inlet of the second flow path of the first heat exchanger, a fourth conduit connecting the outlet of the second flow path of the first heat exchanger to the compressor inlet port, a fifth conduit connecting the compressor discharge port to the inlet of the second flow path of the second heat exchanger, a sixth conduit connecting the outlet of the second flow path of the second heat exchanger to the first inlet port of the first turbine, a seventh conduit connecting the sixth conduit to components that utilize cool, relatively high pressure air, an eighth conduit connecting the first turbine discharge port to the inlet of the second turbine inlet port, a ninth conduit connecting the eighth conduit to components that utilize cool, relatively medium pressure air, and a tenth conduit connecting the second turbine discharge port to components that utilize cool, relatively low pressure air.

12. The apparatus of claim 11 wherein said fourth conduit includes a first flow control valve therein, said seventh conduit includes a second flow control valve therein, said ninth conduit includes a third flow control valve therein, and said tenth conduit includes a fourth flow control valve therein.

* * * * *

UNITED STATES PATENT AND TRADEMARK OFFICE
CERTIFICATE OF CORRECTION

PATENT NO.  : 5,511,374
DATED       : April 30, 1996
INVENTOR(S) : Marvin R. Glickstein et al It is certified that error appears in the above-indentified patent and that said Letters Patent is hereby corrected as shown below:

```
In line 5 of column 1, change "in" to --on--.
In line 15 of column 6, change "compress air" to --compressed air--.
In  line 12 of column 7, change "pan" to --part--.
In line 65 of column 7, change "pan" to --part--.
In line 15 of column 8, change "low compressor" to --low pressure
   compressor".
In line 6 of column 9, change "Portion" to --portion--.
```

Signed and Sealed this

Tenth Day of June, 1997

*Attest:*

BRUCE LEHMAN

*Attesting Officer*   *Commissioner of Patents and Trademarks*